(12) United States Patent
Szalony

(10) Patent No.: US 6,723,234 B2
(45) Date of Patent: Apr. 20, 2004

(54) FLUID CONTAMINATION COLLECTION SYSTEM

(75) Inventor: Norman Szalony, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 15 days.

(21) Appl. No.: 10/124,100

(22) Filed: Apr. 17, 2002

(65) Prior Publication Data

US 2003/0000877 A1 Jan. 2, 2003

Related U.S. Application Data

(60) Provisional application No. 60/301,741, filed on Jun. 27, 2001.

(51) Int. Cl.$^7$ .............................................. B01D 39/00
(52) U.S. Cl. .................. 210/168; 210/435; 210/445; 210/455; 210/496; 210/500.1; 210/507; 210/508
(58) Field of Search .............................. 210/168, 435, 210/445, 455, 496, 499, 500.1, 507, 508

(56) References Cited

U.S. PATENT DOCUMENTS 6,582,593 B2 * 6/2003 Wolford et al. ............. 210/168

* cited by examiner

*Primary Examiner*—David A Reifsnyder
(74) *Attorney, Agent, or Firm*—Brinks Hofer Gilson & Lione

(57) ABSTRACT

A fluid contaminant collection system is provided where a filter passively interacts with the fluid to remove contaminants from the fluid. The system includes a wall defining at least a portion of a chamber or passageway. Located within the chamber or passageway is the filter. The filter includes a contaminant removal portion and is located within the chamber or housing to interact with the fluid. During interaction between the fluid and the filter, the fluid passes or washes over the filter and contaminants are removed by the contaminant removal portion from the fluid.

31 Claims, 1 Drawing Sheet

FLUID CONTAMINATION COLLECTION SYSTEM

CROSS-REFERENCE TO RELATED APPLICATION

This application claims the benefit of prior provisional application Ser. No. 60/301,741, filed Jun. 27, 2001.

BACKGROUND OF THE INVENTION

1. Field of the Invention

The present invention generally relates to fluid filtering. More specifically, the present invention relates to a fluid contamination collection system where contaminants are passively removed from a fluid as the fluid passes over a filter media.

2. Description of the Prior Art

Current standard filtering systems are inherently active systems. By this, it is meant that a filter media achieves filtration by forcing the contaminated fluid, under pressure, to flow through the filter media. In such a system, the filter media is usually placed on the suction side of a pump, or in another section of the fluid circuit, to keep sensitive components such as valves, solenoids and the pump itself, from acquiring a buildup of contaminants that may rob the components of their functionalities. The degradation of these functionalities may vary in degree up to and including failure.

One major limitation of a filtration system of this variety is that as the filter media traps an increased amount of contaminants, flow through the filter media itself becomes increasingly obstructed. Forced fluid flow through a filter media itself, and in particular a "dirty" filter media, causes a parasitic energy loss in the fluid system and an accompanying pressure drop. This energy loss and pressure drop increases as the filter media becomes more fully saturated with additional contaminants. The filter media, as a result, must be replaced frequently and regularly.

In automotive applications, contaminants (iron, sand and corundum, etc.) from the manufacturing and production of the various components in contact with the circulated fluid causes damage to other components (such as axles, transmissions, other drive train elements and engines) from the first usage of the automotive vehicle. If these or destructed particles are filtered, beginning with the first usage of the vehicle, smaller components could be designed and an increased durability achieved. Normal post manufacturing cleaning and washing procedures, while removing the bulk of contaminants, are limited in their effectiveness and leave an amount of contaminants that is undesirable. As a result of this limited effectiveness, at the first startup and operation of the vehicle, the contaminants are caused to circulate throughout the fluid circuit and some, inevitably, form an initial build up on the various components served by that fluid circuit.

In view of the above limitations and other drawbacks not specifically mentioned herein, it is seen that there exists a need for a contamination collection system that can eliminate contaminants from a fluid system before and from the time of first circulation of fluid through the circuit.

It is accordingly an object of this invention to provide a fluid contamination collection system that overcomes the limitations and drawbacks of the prior art.

It is also an object of this invention to provide a contamination collection system that removes contaminants before and from the initial operation of the fluid circuit.

A further object of this invention is to provide a fluid contamination collection system that requires minimal or no changing of the filter media.

Still another object of this invention is to provide a fluid contamination collection system passive fluid movement is used to cleanse contaminants from the fluid.

It is also an object of this invention is to provide a fluid contamination collection system where fluid that is otherwise actively moved through the fluid circuit is passively filtered.

Another object of this invention is to provide a fluid contamination collection system suitable for use with an automotive vehicle.

SUMMARY OF THE INVENTION

In analyzing fluid systems, it is seen that in most fluid circuits, there exists an area where the fluid moves as a result of external forces and not a result of a pump or other active devices. For example, in an automotive vehicle, normal vehicle movement, such as accelerating, braking, cornering and other movements resulting from the roadway topography and surface conditions, causes the fluid in the various fluid circuits to undergo movement. As used herein, this type of fluid movement, where the action causing movement of the fluid is not itself specifically intended to cause movement of the fluid, is referred to as passive fluid movement.

In overcoming the limitations of the prior art and achieving the above stated and other objects, the present invention provides a fluid contamination collection system that utilizes passive fluid movement to cleanse the fluid. Generally, the system of the present invention includes a structure defining a housing or vessel with interior surfaces defining a chamber or passageway. The structure is further adapted to retain a fluid therein or have a fluid circulate therethrough. Located within the structure and secured or otherwise retained adjacent to at least one of the interior surfaces of the structure is a filter. Prior to initial operation of the fluid system, as well as during normal operation of the fluid system, the fluid is caused to pass over the filter or to come into contact with the filter as a result of passive forces on the fluid the fluid does not pass through the filter in a traditional sense. In other words, the fluid does not encounter a filter having a leading or high pressure side (where contaminants are trapped there against) and a trailing or low pressure side where the fluid has been cleansed of contaminants of a predetermined size. As a result of the fluid passing over the filter, contaminants from the fluid are trapped by the filter media and removed from the fluid itself.

In another aspect, the present invention is a filter having features enabling the filter to be fixedly positioned on an interior surface of a structure within which a fluid is permitted to flow over the filter, thereby allowing the filter to passively remove contaminants from the fluid, even though the fluid itself is being actively move or circulated.

Additional objects, features and benefits of the present invention will readily become apparent to those skilled in the art from the above brief description of the invention and the detailed description that follows, and taken in conjunction with the attached drawings and the appended claims.

DETAILED DESCRIPTION OF THE PREFERRED EMBODIMENTS

Figure 1:
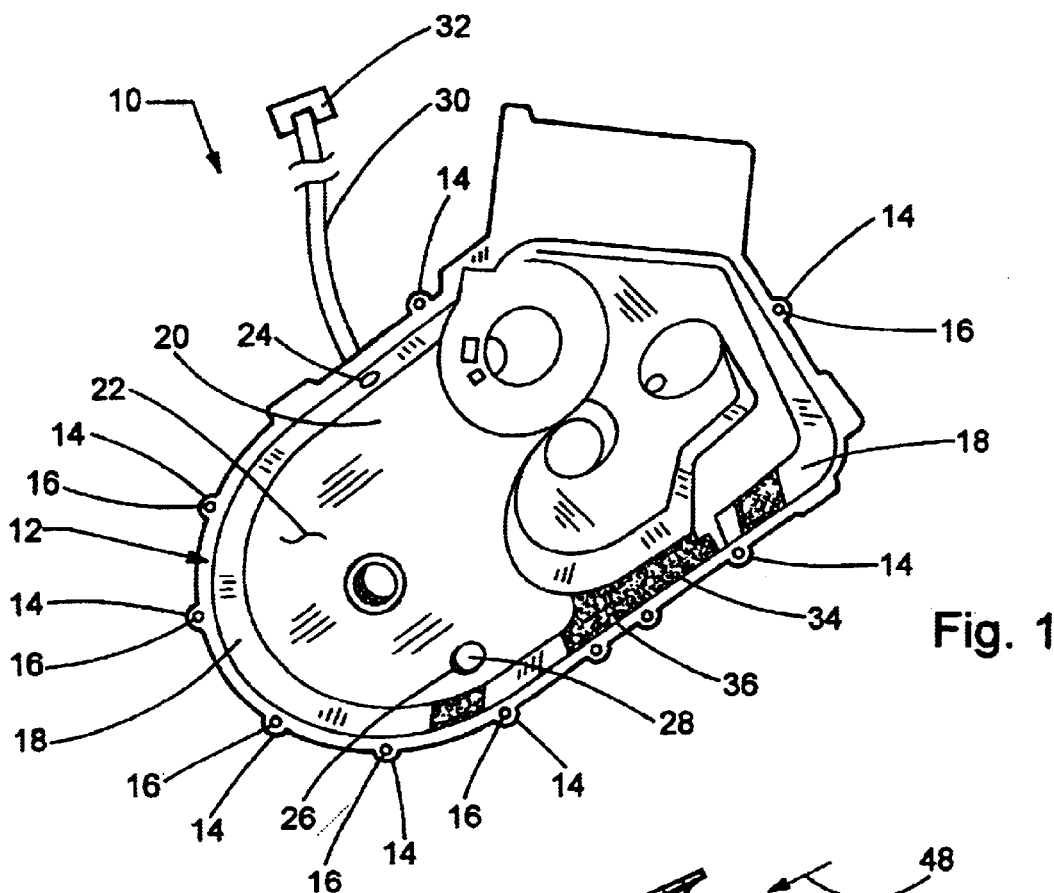
FIG. 1 is a perspective view of an automotive component defining a chamber within which a fluid is retained and passively moved and incorporating an embodiment according to the principles of the present invention.

Referring now to the drawings, seen in FIG. 1 is a perspective view of a manual transmission gearbox housing incorporating the principles of the present invention to form a fluid contaminant collection system. The housing, generally designated at 10, includes a peripheral flange 12 defining a mating surface. The flange 12 is formed with features allowing the housing 10 to be matingly and sealingly engaged with a second portion of the gear box (not shown, but as will be readily appreciated by one of ordinary skill in the art). In FIG. 1, a series of bosses 14, having apertures 16 defined therein, are provided on the flange 12 to receive bolts or other fasteners, therethrough. The fasteners matingly engage with corresponding features, such as threaded bores, on the opposing portion of the gearbox.

The flange 12 extends from a sidewall 18 of the housing 10. Integrally formed with the sidewall 18 and cooperating therewith to define a chamber 22, is one or more additional walls, such as end wall 20.

The housing 10 additionally includes an inlet 24, via which the gearbox is filled with transmission fluid, and an outlet 26, via which transmission fluid may be drained from the gearbox. The outlet 26 is sealingly engaged and closed by an appropriate plug 28, such as a threaded plug in the situation where the outlet 26 itself is threaded. The inlet 24 is illustrated as being coupled to a fill tube 30 equipped with an appropriate closure cap 32 that prevent the introduction of foreign substances and materials into the gearbox. The inlet 24 and outlet 26 may be positioned at various locations about the housing 10 or positioned in the corresponding portion of the gearbox to which housing 10 matingly engages. These features are therefore only representatively illustrated and located in FIG. 1.

Figure 3:
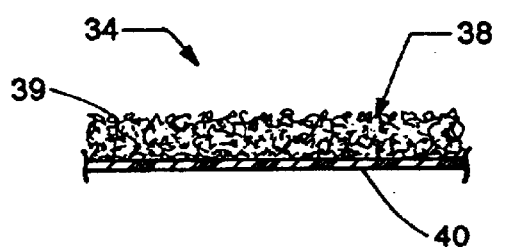
FIG. 3 is a cross-sectional view through a filter according to the present invention.

Provided within the chamber 22 of the housing 10, is a filter 34. The filter 34 is passive, meaning that fluid flow is not through the filter 34 (as described above) and the filter 34 does not have a high pressure upstream side and a low pressure downstream side. Rather, the filter 34 is such that the removal of contaminants occurs as a result of fluid flowing over the surface of the filter media and among the elements of the filter media. The filter 34 itself may be constructed from a variety of materials including, without limitation, plastics, metals, textiles, or paper products. As seen in the cross-sectional view of FIG. 3, the filter media of the filter 34 is preferably a fibrous material 38 and includes a plurality of strands 39 held together by a base or substrate portion 40 and otherwise forming a pad, similar in nature to a section of carpeting or to a plastic scouring pad. The particular material utilized for the fibrous material 38 and base 40 of the filter 34 will be selected based upon other design criteria, including, but not limited to, the nature of the fluid with which it will be used and its durability and resistance to degradation by that fluid and the specific environment in which it will be used. For example, if used in a lubrication oil system, the material for the filter 34 will exhibit a resistance to degradation by lubricating oils at temperatures of 150° C. and beyond.

The filter 34 is secured to an interior surface of the housing 10 at a location where the fluid will have contact with the filter 34. The filter 34 may be secured to an interior surface, such as the sidewall 18 as seen in FIG. 1, by any means best suited by the housing 10, filter 34 and the fluid contained within the housing 10. As such, the filter 34 may be mechanically secured by bolts, press fit into place, welded in place, magnetically retained in place, adhesively secured or otherwise retained. In the illustrated embodiment of FIG. 1, the filter 34 is secured to the sidewall 18 by an adhesive 36 or similarly functioning material.

In use, movement of the vehicle as a result of acceleration, braking, cornering, road surface conditions or topography will passively cause movement of the fluid retained in the housing 10. As the fluid moves within the housing 10, the fluid will be caused to pass or wash over the filter 34. As the fluid washes over the filter 34, contaminants in the fluid will adhere to or become trapped by the fibrous material 38 or other filter media. Accordingly, the fluid will be cleansed of the contaminants.

Figure 2:
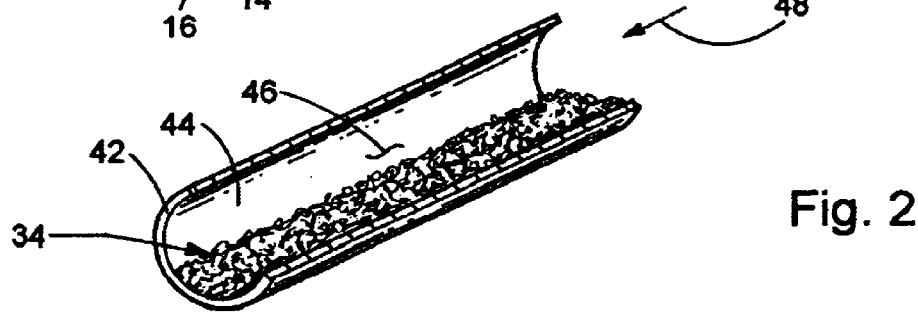
FIG. 2 is a perspective view with portions broken away illustrating a vessel incorporating a filter media embodying the principles of the present invention.

An alternative application of the present invention is generally illustrated in FIG. 2. In this application, the filter 34 is substantially the same as the filter seen in FIG. 3 and discussed in connection with FIG. 1. For that reason, the attributes of the filter 34 need not be re-discussed in connection therewith. Instead of being incorporated within a manual transmission housing 10, the filter 34 shown in FIG. 2 is located within a conduit or vessel 42. The vessel 42 includes an interior wall 44 that defines a passageway 46 for the flow of a fluid generally in the direction of arrow 48. The filter 34 is mounted within the passageway 46 to a section of the interior wall 44 by means of one of the previously mentioned secure methods and mechanisms. Preferably, in this embodiment as well as in the prior embodiment, the filter 34 is located at a relative low position of the wall 44.

In this embodiment, fluid flow is not passive. Rather, flow is forced by a pump or other means. The filter 34 itself, however, operates in a passive manner. Again, meaning that the filter locks a high pressure upstream side and a low pressure downstream side. The fluid is instead free to flow over and among the strands 39 of the fibrous material 38 or other filter media, with contaminants adhering to or becoming trapped thereby.

As seen from the above discussion, the present invention will have utility in the numerous fluidic systems of an automotive vehicle. Such systems include, but are not limited to, lubricating systems, hydraulic systems including braking systems, cooling systems and fuel systems. As such, the present invention will be seen as usable with fluids such as lubricating oils, hydraulic fluids, coolants fluids and fuel fluids. Specific automotive applications would include engines, transmissions, front and rear and center differential and axial assemblies, radiators, power steering and gas tanks. The above lists of applications are recited only in the interest of illustration and are not intended to limit the invention to these specific applications. Persons skilled in the art will realize that in addition to the above automotive applications, other automotive applications will become apparent, as will applications in other industrial and commercial settings.

Incorporation of the invention into fluid systems has shown that the fluid contaminate collection system of the present invention catches and traps all kinds of materials (metallic and non-metallic), as well as a wide variety of sizes of material, including particles less than 0.030 mm in size (the general lower limit of engine oil filters). In laboratory testing, the present invention achieved contamination reductions of 50% after 15 minutes, 80% after 1.5 hours and 90% after 24 hours.

In a test involving employment of the invention in a rear axle, results were similarly impressive. Two conventional rear axles were test run, one incorporating the filter of the present invention and the other without such a filter. After three operating cycles, with a standstill period between each operating cycle, the rear axle incorporating the present invention exhibited a reduction in the amount of contaminates in the lubricating fluid by 90%. The rear axle without the present invention exhibited contamination impact and wear exposure on its various components, obviously due to no contaminate collection system being in place.

Benefits from the employment of the present invention include, not only increased lifetime of the associated components (the lifetime of an axle could likely be doubled), but also the ability to design smaller components with a reduced manufacturing costs. The latter being achieved through a reduction in the expensive, and sometimes ineffective washing operations used during production. Such washing operations, while being expensive, also only provide a limited benefit.

With trends being toward lighter weight oils and fluids, contamination will only become an increased problem in the future. The present invention reduces the amount of contaminants in the fluid and achieves an increase in the useful life of the system.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A fluid contaminant collection system comprising:
   a housing having at least one wall with an interior surface, said interior surface at least partially defining a chamber and said chamber adapted to retain a fluid therein; and
   a filter including a contaminant removal portion, said filter located within said chamber and retained adjacent to said interior surface, said filter positioned within said chamber such that fluid retained within said chamber contacts said filter and interacts with said filter whereby contaminants in the fluid are removed from the fluid and retained with said contaminant removal portion of said filter.

2. The system of claim 1 wherein said filter is attached to said interior surface.

3. The system of claim 2 wherein said filter is attached to said interior surface by bonding.

4. The system of claim 1 wherein said filter includes a base portion, said contaminant removal portion extending from said base portion.

5. The system of claim 4 wherein said contaminant removal portion is comprised of a fibrous material.

6. The system of claim 5 wherein said fibrous material includes a plurality of strands randomly oriented with respect to one another.

7. The system of claim 5 wherein said fibrous material includes a plurality of strands oriented in a pattern with respect to one another.

8. The system of claim 5 wherein said fibrous material includes a plurality of strands woven together.

9. The system of claim 1 wherein the contaminant removal portion is comprised of a fibrous material.

10. The system of claim 9 wherein said fibrous material includes a plurality of strands randomly oriented with respect to one another.

11. The system of claim 9 wherein said fibrous material includes a plurality of strands oriented in a pattern with respect to one another.

12. The system of claim 9 wherein said fibrous material includes a plurality of strands woven together.

13. The system of claim 9 wherein said fibrous material includes a plurality of strands of plastic.

14. The system of claim 9 wherein said fibrous material includes a plurality of strands of textile material.

15. The system of claim 9 wherein said fibrous material includes a plurality of strands that are straight or curved.

16. The system of claim 1 wherein said filter is located on an interior surface of said housing in a lower half of said housing when said housing is in use.

17. The system of claim 1 wherein said filter is located on a bottom interior surface of said housing.

18. The system of claim 1 wherein said housing includes portions defining a fluid inlet and portions defining a fluid outlet.

19. The system of claim 1 wherein said housing is a gearbox housing.

20. The system of claim 1 wherein said housing is a differential housing.

21. The system of claim 1 wherein said housing is an axle housing.

22. The system of claim 1 wherein said housing is a conduit.

23. The system of claim 1 further comprising a plurality of filters located within said chamber.

24. The system of claim 1 wherein said filter passively interacts with the fluid.

25. The system of claim 1 wherein said housing is a housing of an automotive vehicle fluid system.

26. A portion of an automotive fluid system comprising:
   a wall member defining at least a portion of a chamber adapted to retain a fluid therein;
   a filter located wholly within said chamber, said filter including a filter media, said filter located within said chamber whereby said filter media passively interacts and contacts fluid retained therein to remove contaminants from the fluid, said filter media generally defining a surface over which the fluid passes.

27. The system according to claim 26 wherein said filter media includes a fibrous material.

28. The system according to claim 27 wherein said fibrous material includes a plurality of strands.

29. The system according to claim 27 wherein said fibrous material includes a plurality of strands randomly oriented with respect to one another.

30. The system according to claim 26 wherein the fluid is passively moved within said system.

31. The system according to claim 26 further comprising a pump actively moving fluid within said system.

* * * * *